F. SIMMONS.
Friction Gears.
No. 138,444.
Patented April 29, 1873.
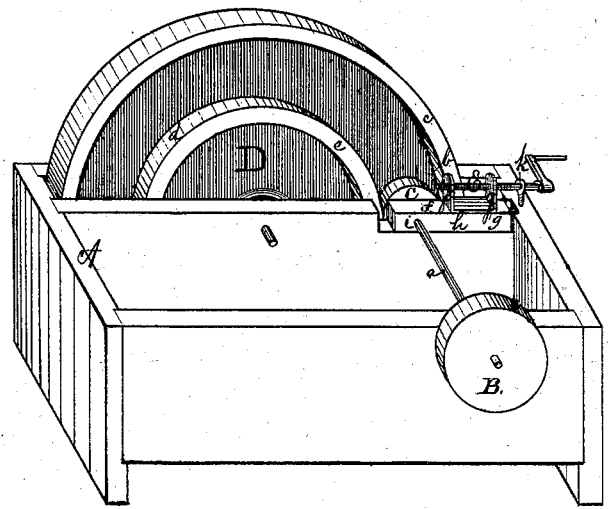
WITNESSES.
INVENTOR.
Franklin Simmons
per Jenkins & Olmstead
Attys.

UNITED STATES PATENT OFFICE.

FRANKLIN SIMMONS, OF NEW ORLEANS, LOUISIANA.

IMPROVEMENT IN FRICTION-GEARS.

Specification forming part of Letters Patent No. 138,444, dated April 29, 1873; application filed October 16, 1872.

*To all whom it may concern:*

Be it known that I, FRANKLIN SIMMONS, of the city of New Orleans, parish of Orleans and State of Louisana, have invented a new, useful, and Improved Friction-Gear; and I hereby declare the following to be a full, clear, and exact description of the same, reference being had to the accompanying illustrative drawing forming a part of this specification.

My improvements relate to an improved friction-gear; which consists of a pulley which has two faces, one of a greater and one of a lesser diameter, which pulley is placed upon a single shaft, and driven by a shifting friction-pinion arranged upon a separate shaft, so as to engage the inner face of that part of the said pulley of greater diameter or the external face of that part of the said pulley of lesser diameter, to the end of securing at pleasure greater power with less speed, or less power with greater speed.

While my improvement may be rendered available for a variety of mechanical purposes, it is designed more especially for the operation of the screw or nut of a cotton-press, which, in practice, and when the cotton therein placed is being subjected to pressure, necessarily requires to be run with great power and with moderate speed, while for reversing the same to release the followers, it should be run with great speed, so as to save time. My device accomplishes both these results in an exceedingly simple, economical, and effective manner, as will be more readily understood by reference to the drawing, wherein it is shown in perspective.

A is the frame-work, upon which the cotton-press may be placed, and which, at the same time, supports the bearings for the shafts and pulleys constituting my improvement, with the gearing for the operation of the press therewith connected. B is the main driving-pulley, placed upon the shaft $a$, to which it is keyed. Upon the opposite end of the said shaft $a$ is keyed the small friction-pulley C. D is the double-faced friction-pulley, before mentioned, constructed, as plainly shown, with an inner face, $b$, upon that part of the said pulley shown at $c$, and with an outer face, $d$, upon that part of the said pulley shown at $e$. The external rim of the said pulley, shown at $c$ aforesaid, is connected with the internal rim of the said pulley shown at $e$ by solid metal; but it is plainly evident that the said rims $c$ and $e$ may be connected by arms with openings between them without in the least degree changing the character of my invention. The said small friction-pulley C is made to engage at pleasure either the inner face of that part of the pulley D, shown at $c$, or the outer face of that part of the said pulley shown at $e$ by means of a clutch, or by means of a set-screw, E, working in the threaded standards $f$ and $g$, rigidly secured to the movable bearing $h$ of the journal-box $i$, in which the said shaft $a$, upon which is the said pulley C, has its bearing. The said set-screw E is held in position by means of the standard K upon the frame A, through which it passes loosely.

For the purpose of running the screw or screws of a cotton-press to secure pressure against the cotton, the pulley C must be made to engage the inner face of the rim of the pulley D, which is of the greater diameter, and for the purpose of running the said screw with a view to relieve the cotton from pressure, the pulley C must be made to engage that rim or face of the said pulley D, which is of the lesser diameter. While the motion of the pulley C is continuous in one direction, the pulley D, it is evident, is moved forward or reversed as the said pulley C is engaged either with the greater or lesser diameters thereof.

Having described my invention, waht I desire to secure by Letters Patent is the following:

The double friction-pulley D, small pulley or roller C, and set-screws E, when the same are combined and arranged substantially as described.

FRANKLIN SIMMONS.

Witnesses:
H. N. JENKINS,
J. C. HUBBELL.